(12) United States Patent
Park et al.

(10) Patent No.: US 10,191,598 B2
(45) Date of Patent: Jan. 29, 2019

(54) COORDINATE INDICATING APPARATUS AND METHOD FOR DRIVING THEREOF

(71) Applicants: SAMSUNG ELECTRONICS CO., LTD., Suwon-si (KR); KOREA ADVANCED INSTITUTE OF SCIENCE AND TECHNOLOGY, Daejeon-si (KR)

(72) Inventors: Sung-soo Park, Suwon-si (KR); Byung-hoon Kang, Suwon-si (KR); Chang-byung Park, Daejeon (KR); Gyu-hyeong Cho, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon-si (KR)

( * ) Notice: Subject to any disclaimer, the term of this patent is extended or adjusted under 35 U.S.C. 154(b) by 192 days.

(21) Appl. No.: 14/845,389

(22) Filed: Sep. 4, 2015

(65) Prior Publication Data

US 2016/0070387 A1    Mar. 10, 2016

(30) Foreign Application Priority Data

Sep. 5, 2014    (KR) .................... 10-2014-0119339

(51) Int. Cl.
  *G06F 3/044* (2006.01)
  *G06F 3/041* (2006.01)
(52) U.S. Cl.
  CPC ............ *G06F 3/044* (2013.01); *G06F 3/0416* (2013.01)
(58) Field of Classification Search
  CPC ........ G06F 3/044; G06F 3/0416; G06F 3/041; G06F 3/0412
  (Continued)

(56) References Cited

U.S. PATENT DOCUMENTS 5,565,658 A * 10/1996 Gerpheide .............. G06F 3/041
                                                                178/18.02
7,868,874 B2    1/2011 Reynolds
(Continued)

FOREIGN PATENT DOCUMENTS

KR    10-2015-0123488 A    11/2015

OTHER PUBLICATIONS

Shin et al., "A 55dB SNR with 230Hz Frame Scan Rate Mutual Capacitor 30×24 Touch-Screen Panel Read-Out IC Using Code-Division Multiple Sensing Technique", 2013 IEEE International Solid-State Circuits Conference, Session 22, Feb. 20, 2013, 3 total pages.

(Continued)

*Primary Examiner* — Koosha Sharifi-Tafreshi
(74) *Attorney, Agent, or Firm* — Sughrue Mion, PLLC

(57) ABSTRACT

A coordinate indicating apparatus includes a channel electrode which includes a first plurality of electrodes arranged in a first direction and a second plurality of electrodes arranged in a second direction perpendicular to the first direction, and which has capacitance between the first plurality of electrodes and the second plurality of electrodes, the capacitance being changed by an approaching contact object; a driver configured to apply driving signals to the first plurality of electrodes simultaneously; a receiver configured to receive response signals from the second plurality of electrodes; and a controller configured to determine a location of the contact object based on the driving signals transmitted to the first plurality of electrodes and the response signals received from the second plurality of electrodes, wherein the driver is configured to simultaneously apply, to the first plurality of electrodes, continuous driving signals according to a matrix corresponding to a (Continued)

Hadamard matrix, and wherein the driving signals exclude a time section.

14 Claims, 12 Drawing Sheets

(58) Field of Classification Search
USPC .................................................. 345/173, 174
See application file for complete search history.

(56) References Cited

U.S. PATENT DOCUMENTS

| | | | |
|---|---|---|---|
| 2009/0277696 A1* | 11/2009 | Reynolds | G06F 3/03547 178/18.06 |
| 2010/0326744 A1* | 12/2010 | Chang | G06F 3/0416 178/18.06 |
| 2011/0043478 A1* | 2/2011 | Matsushima | G06F 3/0416 345/174 |
| 2011/0090173 A1* | 4/2011 | Huang | G06F 3/044 345/174 |
| 2011/0148785 A1* | 6/2011 | Oda | G06F 3/03545 345/173 |
| 2013/0201154 A1 | 8/2013 | Yun et al. | |
| 2013/0211757 A1* | 8/2013 | Miyamoto | G06F 3/0416 702/65 |
| 2014/0104236 A1* | 4/2014 | Hamaguchi | G06F 3/0416 345/174 |
| 2015/0091845 A1* | 4/2015 | Park | G06F 3/044 345/174 |
| 2015/0309655 A1* | 10/2015 | Park | G06F 3/0416 345/173 |

OTHER PUBLICATIONS

Hamaguchi et al., "A 240Hz-Reporting-Rate 143×81 Mutual-Capacitance Touch-Sensing Analog Front-End IC with 37dB SNR for 1mm-Diameter Stylus", 2014 IEEE International Solid-State Circuits Conference, Session 12, Feb. 11, 2014, 3 total pages.

* cited by examiner (a)

(b)

(a)

(b)

COORDINATE INDICATING APPARATUS AND METHOD FOR DRIVING THEREOF

CROSS-REFERENCE TO RELATED APPLICATION(S)

This application claims priority from 35 U.S.C. § 119(a) of a Korean patent application filed on Sep. 5, 2014 in the Korean Intellectual Property Office and assigned Serial No. 10-2014-0119339, the entire disclosure of which is hereby incorporated by reference.

TECHNICAL FIELD

Apparatuses and methods consistent with exemplary embodiments relate to a coordinate indicating apparatus and a method for driving thereof, and more particularly, to a coordinate indicating apparatus which can enhance a receive sensitivity of a sensor without increasing a driving time, and a method for driving thereof.

BACKGROUND

Smartphones or tablet PCs are widely used in recent years, and development of technology for a contact location measuring device embedded therein is ongoing. The smartphones or tablet PCs are mostly provided with a touch screen, and users may indicate specific coordinates of the touch screen using a finger or a stylus pen. The user may input a specific signal to the smartphone by indicating specific coordinates of the touch screen.

The touch screen may operate based on an electric method, an infrared ray method, and a ultrasonic method, and examples of the touch screen operated in the electric operating method include a resistive touch screen (R-type touch screen) and a capacitive touch screen (C-type touch screen).

In the related art, the R-type touch screen, which can recognize a finger and a stylus pen of a user simultaneously, was popularly used. However, the R-type touch screen has a problem of reflection caused by an air layer formed between ITO layers.

Therefore, the C-type touch screen is increasingly used in recent years. The C-type touch screen is a touch screen which operates by detecting a difference in capacitance of a transparent electrode caused by contact with an object.

Such a C-type touch screen has a trade-off relationship between receive sensitivity of a sensor and a driving time. That is, in order to enhance the receive sensitivity of the sensor, the driving time should increase. However, there is a problem that the increase in the driving time may cause a sensing speed of the sensor to be reduced.

In order to solve this problem, a recent method applies driving signals corresponding to different digital codes to a plurality of driving electrodes, simultaneously, and then extracting location information by decoding response signals. In this case, the digital code applied to each channel is mutually orthogonal signals, and thus a response signal regarding a specific channel can be easily decoded and extracted from reception signals where responses in the plurality of channels are mixed. That is, compared to a sequence driving method, this method has a long driving time for a single channel and thus can enhance receive sensitivity of a sensor.

However, since the related-art method generates a plurality of driving signals using the Hadamard matrices, the first digital code applied to the plurality of channels has the same value. Therefore, a signal Vt1 received in the first section has a very great value compared to signals Vt2-Vtn received in the other sections, and there is a tight limit to configuring a receiving end in order to detect signals in all sections including the first section.

That is, in order to detect a minute change in capacitance of a driving electrode, the level of a signal which can be received at a reception circuit should be set to be low, but, in order to receive a great reception signal Vt1 in the first section, the reception circuit should have a great dynamic range.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

As the disclosure allows for various changes and numerous exemplary embodiments, particular exemplary embodiments will be illustrated in the drawings and described in detail in the written description. However, this is not intended to limit the present invention to particular modes of practice, and it is to be appreciated that all changes, equivalents, and substitutes that do not depart from the spirit and technical scope of the exemplary embodiments are encompassed in the exemplary embodiments. In the description of the exemplary embodiments, certain detailed explanations of related art are omitted when it is deemed that they may unnecessarily obscure the essence of the exemplary embodiments.

The terms such as "first" and "second" are used herein merely to describe a variety of constituent elements, but the constituent elements are not limited by the terms. The terms are used only for the purpose of distinguishing one constituent element from another constituent element.

The terms used in the present specification are used for explaining a specific exemplary embodiment, not limiting the present inventive concept. Thus, the singular expressions in the present specification include the plural expressions unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

The terms, such as 'unit' or 'module', etc., should be understood as a unit that processes at least one function or operation and that may be embodied in a hardware manner, a software manner, or a combination of the hardware manner and the software manner. In addition, a plurality of 'modules' or a plurality of 'units' may be integrated as at least one module to be embodied as at least one processor (not shown) except for a 'module' or a 'unit' which needs to be embodied in specific hardware.

One or more exemplary embodiments provide a coordinate indicating apparatus which can enhance receive sensitivity of a sensor without increasing a driving time, and a method for driving thereof.

According to an aspect of an exemplary embodiment, a coordinate indicating apparatus includes a channel electrode which includes a first plurality of electrodes arranged in a first direction and a second plurality of electrodes arranged in a second direction perpendicular to the first direction, and which has capacitance between the first plurality of electrodes and the second plurality of electrodes, the capacitance being changed by an approaching contact object; a driver configured to apply driving signals to the first plurality of electrodes simultaneously; a receiver configured to receive response signals from the second plurality of electrodes; and a controller configured to determine a location of the contact object based on the driving signals transmitted to the first plurality of electrodes and the response signals received from the second plurality of electrodes, wherein the driver may be configured to simultaneously apply, to the first plurality of electrodes, continuous driving signals according to a matrix corresponding to a Hadamard matrix, and wherein the driving signals exclude a time section.

The controller may be configured to calculate capacitance at a plurality of points of intersection which are formed between the first plurality of electrodes and the second plurality of electrodes, and determine the location of the contact object based on the calculated capacitance.

The first plurality of electrodes may be divided into a plurality of sub groups which may be continuously arranged into a plurality of channels, and the driver may be configured to apply the driving signals to all electrodes in a single sub group simultaneously.

The plurality of sub groups may include a first sub group and a second sub group, and wherein the driver may be configured to apply continuous driving signals to all of the electrodes in the first sub group, and then apply continuous driving signals to all of the electrodes in the second sub group simultaneously.

The first sub group and the second sub group may share at least one electrode.

The first sub group and the second sub group may be continuously arranged.

The controller may be configured to calculate the location of the contact object based on first sub group capacitance, in which a first offset is applied to a first value based on a capacitance of the first sub group, and second sub group capacitance in which a second offset is applied to a second value based on capacitance of the second sub group, and wherein the first offset and the second offset may be determined such that the first sub group capacitance and the second sub group capacitance have a same value with respect to the shared first electrode.

The driver may be configured to apply the driving signals only to one sub group from among the plurality of sub groups.

The electrodes in the one sub group to which the driving signals are applied may be changed over a predetermined time unit.

The receiver may be configured to receive the response signals of the second plurality of electrodes in parallel in a plurality of channels.

The driver may be configured to generate, as driving signals, a first plurality of pulse signals, the first plurality of pulse signals starting with a rising edge and ending with a falling edge according to a first value of the matrix, and to generate, as driving signals, a second plurality of pulse signals, the first plurality of pulse signals starting with a falling edge and ending with a rising edge in response to a second value of the matrix.

The receiver may be configured to accumulate the response signals as a first plurality of response signals using a first capacitor, and as a second plurality of response signals using a second capacitor.

According to another aspect of an exemplary embodiment, a coordinate indicating apparatus, includes a channel electrode which includes a first plurality of electrodes arranged in a first direction and a second plurality of electrodes arranged in a second direction perpendicular to the first direction, and which has capacitance between the first plurality of electrodes and the second plurality of electrodes, the capacitance being changed by a contact object; a driver configured to apply continuous driving signals corresponding to a Hadamard matrix to the first plurality of electrodes simultaneously; a receiver configured to receive response signals from the plurality of second electrodes; and a controller configured to determine a location of the contact object based on the driving signals transmitted to the first electrodes and the response signals received from the second electrodes, wherein the controller may be configured to determine the location of the contact object using only response signals generated in response to driving signals excluding a time section where the driving signals applied to the electrodes have a same value in the Hadamard matrices.

The first plurality of electrodes may be divided into a plurality of sub groups which may be continuously arranged into a plurality of channels, wherein the plurality of sub groups includes a first sub group and a second sub group, the first sub group sharing at least one electrode with the second sub group, and the controller may be configured to calculate the location of the object based on a first sub group capacitance, in which a first offset is applied to a first value based on capacitance of the first sub group, and second sub group capacitance, in which a second offset is applied to a second value based on capacitance of the second sub group, and wherein the first offset and the second offset are determined such that the first sub group capacitance and the second sub group capacitance have a same value with respect to the shared first electrode.

According to another aspect of an exemplary embodiment, a coordinate indicating apparatus includes a channel electrode which includes a first plurality of electrodes arranged in a first direction and a second plurality of electrodes arranged in a second direction perpendicular to the first direction, and which has capacitance between the first plurality of electrodes and the second plurality of electrodes changed by a contact object; a driver configured to apply continuous driving signals including a first value and a second value different from the first value, to the first plurality of electrodes simultaneously; a receiver configured to receive response signals from the second plurality of electrodes; and a controller configured to determine a location of the contact object based on the driving signals transmitted to the first plurality of electrodes and the response signals received from the second plurality of electrodes, wherein the driver may be configured to generate, as driving signals, a first plurality of pulse signals, the first plurality of pulse signals starting with a rising edge and ending with a falling edge according to the first value, and generate, as driving signals, a second plurality of pulse signals, the second plurality of pulse signals starting with a falling edge and ending with a rising edge according to the second value.

The receiver may be configured to accumulate the response signals as a first plurality of response signals using a first capacitor, and as a second plurality of response signals using a second capacitor.

The receiver may include an integrator configured to integrate the first plurality of response signals in a first direction of a third capacitor, and integrate the second plurality of response signals in a second direction of the third capacitor.

According to another aspect of an exemplary embodiment, a coordinate indicating apparatus includes a channel electrode which comprises a first plurality of electrodes arranged in a first direction and a second plurality of electrodes arranged in a second direction perpendicular to the first direction, and which has capacitance between the first plurality of electrodes and the second plurality of electrodes changed by a contact object; a driver configured to apply driving signals to the first plurality of electrodes simultaneously; a receiver configured to receive response signals from the second plurality of electrodes; and a controller configured to determine a location of the contact object based on the driving signals transmitted to the first plurality of electrodes and the response signals received from the second plurality of electrodes, wherein the receiver may be configured to accumulate the response signals as a first plurality of response signals in a first direction of a first capacitor, and accumulate the response signals as a second plurality of response signals in a second direction of the first capacitor.

The receiver may further include a second capacitor configured to accumulate and store the response signals over a predetermined period using electric charge accumulated in the first capacitor.

The driver may be configured to apply continuous driving signals corresponding to a Hadamard matrix to the first plurality of first electrodes.

The first plurality of response signals may correspond to an increase in the driving signals, and the second plurality of response signals may correspond to a reduction in the driving signals.

According to another aspect of an exemplary embodiment, a control method of a coordinate indicating apparatus includes applying driving signals to a first plurality of electrodes arranged in a first direction simultaneously; receiving response signals from a second plurality of electrodes arranged in a second direction perpendicular to the first direction; and determining a location of a contact object based on the driving signals transmitted to the first plurality of electrodes and the response signals received from the second plurality of electrodes, wherein the applying comprises simultaneously applying to the first plurality of electrodes, continuous driving signals corresponding to a Hadamard matrix excluding a time section.

The applying may include generating, as driving signals, a first plurality of pulse signals, the first plurality of pulse signals starting with a rising edge and ending with a falling edge according to a first value of a matrix, and generating, as driving signals, a second plurality of pulse signals, the second plurality of pulse signals which starting with a falling edge and ending with a rising edge according to a second value of the matrix.

According to another aspect of an exemplary embodiment, a coordinate indicating apparatus includes a channel electrode which includes a first plurality of electrodes arranged in a first direction, and a second plurality of electrodes arranged in a second direction perpendicular to the first direction, wherein a capacitance between the first plurality of electrodes and the second plurality of electrodes is changed by a location of a contact object; a driver configured to apply driving signals to the plurality of first electrodes simultaneously; a receiver configured to receive response signals from the second plurality of electrodes; and a controller configured to determine the location of the contact object based on the driving signals transmitted to the first electrodes and the response signals received from the second electrodes, wherein the driving signals are applied according to a matrix, the matrix corresponding to a Hadamard matrix having a plurality of elements arranged in at least a first column, in which all of the elements of the first column of the Hadamard matrix are replaced with a value of zero.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

DETAILED DESCRIPTION

Hereinafter, exemplary embodiments will be described in greater detail with reference to the accompanying drawings. In the following description, well-known functions or constructions are not described in detail since they would obscure the exemplary embodiments in unnecessary detail.

Figure 1:
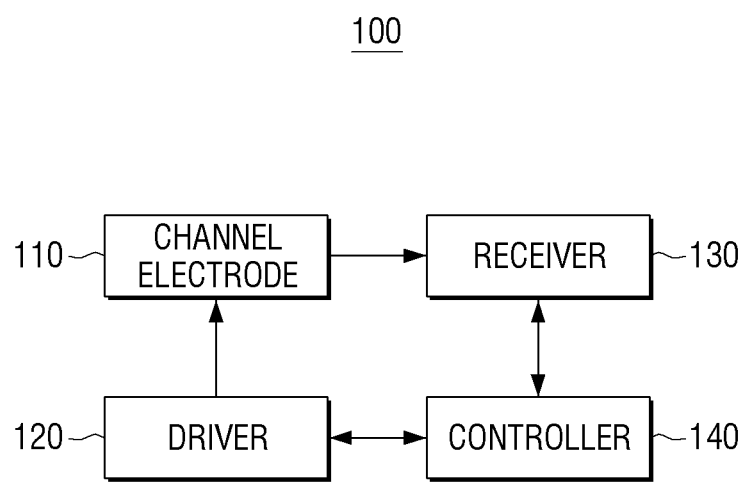
FIG. 1 is a block diagram showing a detailed configuration of a coordinate indicating apparatus according to an exemplary embodiment.

FIG. 1 is a block diagram showing a detailed configuration of a coordinate indicating apparatus according to an exemplary embodiment.

Referring to FIG. 1, the coordinate indicating apparatus 100 may include a channel electrode 110, a driver 120, a receiver 130, and a controller 140. The coordinate indicating apparatus 100 may be a touch pad or a touch screen, or may be a notebook computer, a mobile phone, a smartphone, a Portable Multimedia Player (PMP), or an MP3 player provided with a touch pad or a touch screen.

The channel electrode 110 includes a plurality of electrodes. Specifically, the channel electrode 110 may include a plurality of electrodes which are arranged in a matrix pattern. For example, the channel electrode 110 may include a plurality of first electrodes which are arranged in a first direction, and a plurality of second electrodes which are arranged in a second direction perpendicular to the first direction. The shape and operation of the plurality of electrodes included in the channel electrode 110 will be explained below with reference to FIG. 2.

The driver 120 may apply driving signals to the plurality of first electrodes. In this case, the driver 120 may apply the driving signals which are distinguished from one another in the unit of electrodes to the first electrodes in the channel electrode 110. Specifically, the driver 120 may apply, to the plurality of first electrodes, continuous driving signals corresponding to the Hadamard matrices, in the unit of the plurality of electrodes simultaneously. Alternatively, the driver 120 may apply, to the plurality of first electrodes, continuous driving signals corresponding to matrices which exclude a time section where the driving signals applied to the electrodes have the same value from among the Hadamard matrices, in the unit of the plurality of electrodes simultaneously. Such an applying method will be explained below with reference to FIG. 6.

Herein, the driving signal may be a pulse signal having a binary value. A detailed shape of the driving signal will be explained below with reference to FIGS. 3 to 5.

The receiver 130 receives a response signal from each of the plurality of second electrodes. Specifically, the receiver 130 may receive, from each of the plurality of second electrodes, a response signal which is accompanied by a variation in capacitance between the plurality of first electrodes and the plurality of second electrodes caused by an approaching contact object. In this case, the receiver 130 may receive the response signals of all of the plurality of second electrodes simultaneously or may receive the response signals in parallel in the unit of the plurality of electrodes.

The controller 140 may control the respective elements of the coordinate indicating apparatus 100, and control the driver 120 to apply the continuous driving signals to the plurality of first electrodes simultaneously at predetermined intervals.

The controller 140 may determine the location of the contact object based on the driving signals transmitted to the first electrodes and the response signals received from the second electrodes. Specifically, the controller 140 may calculate the capacitance between electrodes at a plurality of points of intersection of the electrodes which are formed between the first electrodes and the second electrode in the electrode unit, and determine the location of the contact object based on the calculated capacitance. For example, in response to the user touching specific coordinates of the channel electrode 110, the capacitance between the first electrode and the second electrode corresponding to the specific coordinates is greatly changed, and the capacitance at neighboring points of intersection is also changed. Therefore, the capacitance at each of the points of intersection is calculated, and then the point of intersection where the change in the capacitance has the greatest value may be determined as the location of the contact object.

According to the above-described exemplary embodiments, since the coordinate indicating apparatus 100 may apply, to the plurality of first electrodes, continuous driving signals corresponding to matrices which exclude a time section where the driving signals applied to the electrodes have the same value, the levels of the signals received in each section are not greatly changed. That is, the range of the signals which can be received at a reception circuit is set to be small, and thus the coordinate indicating apparatus 100 is configured to easily detect a minute change in the capacitance, so that receive sensitivity can be enhanced.

Although only the basic configuration of the coordinate indicating apparatus 100 is illustrated in the above example, the coordinate indicating apparatus 100 may further include other elements in addition to the above-described elements. For example, when the coordinate indicating apparatus 100 is a touch screen, the coordinate indicating apparatus 100 may further include a display configuration. When the coordinate indicating apparatus 100 is a smartphone or a PMP, the coordinate indicating apparatus 100 may further include a display, a storage, and a communicator, etc.

Figure 2:
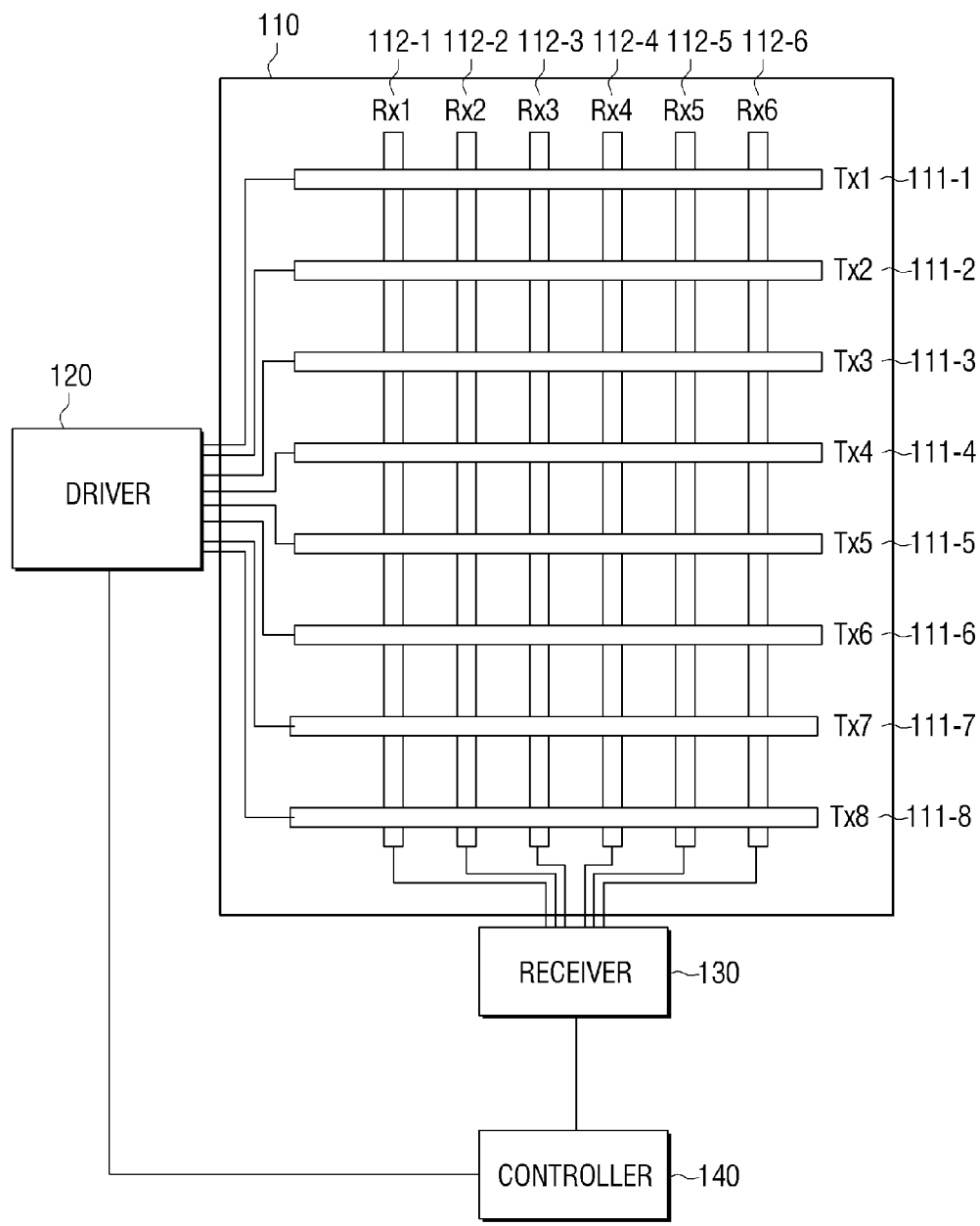
FIG. 2 is a view showing a circuit diagram of a coordinate indicating apparatus according to an exemplary embodiment.

FIG. 2 is a view showing a circuit diagram of a coordinate indicating apparatus according to an exemplary embodiment.

Referring to FIG. 2, the coordinate indicating apparatus 100 may include a channel electrode 110, a driver 120, a receiver 130, and a controller 140.

The channel electrode 110 includes a plurality of first electrodes and a plurality of second electrodes. Specifically, as shown in FIG. 2, the channel electrode 110 may include a first electrode group 111 and a second electrode group 112 which are arranged in different directions.

The first electrode group 111 may include a plurality of first electrodes 111-1, 111-2, 111-3, 111-4, 111-5, 111-6, 111-7, 111-8 which are arranged in a first direction (for example, a horizontal direction). Herein, the first electrode may be a transparent electrode and may be an Indium Tin Oxide (ITO). The plurality of first electrodes 111-1, 111-2, 111-3, 111-4, 111-5, 111-6, 111-7, 111-8 in the first electrode group 111 may be transmitting electrodes for transmitting predetermined driving signals (Tx signals) when detecting the location of a finger.

The second electrode group 112 may include a plurality of second electrodes 112-1, 112-2, 112-3, 112-4, 112-5, 112-6 which are arranged in a second direction (for example, a vertical direction). The second electrode may be a transparent electrode and may be an ITO. The plurality of second electrodes 112-1, 112-2, 112-3, 112-4, 112-5, 112-6 in the second electrode group 111 may be receiving electrodes for receiving Rx signals which are generated by the Tx signals inputted from the first electrodes when detecting the location of a finger.

In the illustrated example of FIG. 2, the first electrode group includes only the eight electrodes and the second electrode group includes only the six electrodes. However, according to another exemplary embodiment, the first electrode group and the second electrode group may be implemented with a different number of electrodes. In addition, in the illustrated example of FIG. 2, the electrode in the electrode group has a simple rectangular shape. However, according to another exemplary embodiment, each of the electrodes may have a more complicated shape.

The driver 120 applies driving signals to the plurality of first electrodes simultaneously. Specifically, the driver 120 may apply continuous driving signals corresponding to the Hadamard matrices (for example, see FIG. 3) to the plurality of first electrodes (for example, 111-1, 111-2, 111-3, 111-4, 111-5, 111-6, 111-7, 111-8 when the unit of the plurality of electrodes is 8) simultaneously. Alternatively, the driver 120 may apply, to the plurality of first electrodes, continuous driving signals corresponding to matrices which exclude a time section where the driving signals applied to the electrodes have the same value from among the Hadamard matrices simultaneously. Such a driving signal may be a binary digital code of a first value and a second value, and may have any one of the shapes illustrated in FIGS. 3 to 5. When the number of first electrodes is greater than the number of columns of the Hadamard matrix, the plurality of first electrodes may be divided in the unit of the number of columns of the matrix. That is, the number of columns (or rows) of the Hadamard matrix may be the unit of electrodes to which the driving signals are applied simultaneously. Specifically, an operation in the unit of the plurality of electrodes will be explained below with reference to FIG. 7.

The receiver 130 receives response signals from the plurality of second electrodes. Specifically, the receiver 130 may receive the response signals of all of the electrodes in the unit of a single electrode serially or may receive the response signals of all of the electrodes in the unit of a plurality of electrodes.

The receiver 130 may include a demodulation and accumulation circuit for processing driving signals including a plurality of pulses, and this will be explained below with reference to FIGS. 8 to 11.

The controller 140 may control the driver 120 and the receiver 130 to apply the driving signals and receive the response signals accompanied by the driving signals. For example, the controller 140 may control the driver 120 to apply the driving signals shown in FIG. 3 to all of the first electrodes 111-1, 111-2, 111-3, 111-4, 111-5, 111-6, 111-7, 111-8 in first to eight time sections simultaneously, and may control the receiver 130 to receive the response signals in the above-mentioned time sections. The above-described time sections may correspond to the number of rows of the Hadamard matrix. For example, since the Hadamard matrix of eight rows and eight columns is used in the present exemplary embodiment, eight time sections are required to determine the location of a contact object. In addition, the eight time sections may serve as a single unit and may be repeated to continuously trace or detect the location of the contact object.

In response to the response signals for all of the second electrodes being received, the controller 140 may calculate capacitance at the plurality of points of intersection of the electrodes, each being formed between the first electrode and the second electrode, and determine the location of an object based on the calculated capacitance. For example, when the capacitance at the point of intersection of the first electrode 111-5 and the second electrode 112-3 has the greatest change, the controller 140 may determine the location where the first electrode 111-5 and the second electrode 112-3 intersect as the location of a contact object.

In the above-described example, the driving signals are collectively applied to all of the first electrodes in the first electrode group. However, according to another exemplary embodiment, the driving signals may be collectively applied to only some of the first electrodes in the first electrode group. That is, when there are a plurality of electrode groups forming the unit of electrodes, the electrodes may be operated in the unit of an electrode group serially and only one of the plurality of electrode groups may be operated to perform local scan.

In addition, in FIG. 2, the plurality of electrodes are arranged in the matrix pattern, but, according to another exemplary embodiment, the plurality of electrodes may be arranged in other patterns in addition to the matrix pattern.

Figure 3:
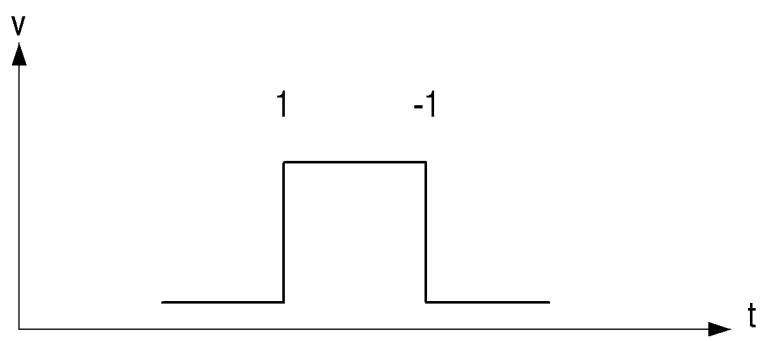
FIGS. 3 to 5 are views showing various examples of a digital code according to an exemplary embodiment.
Figure 4:
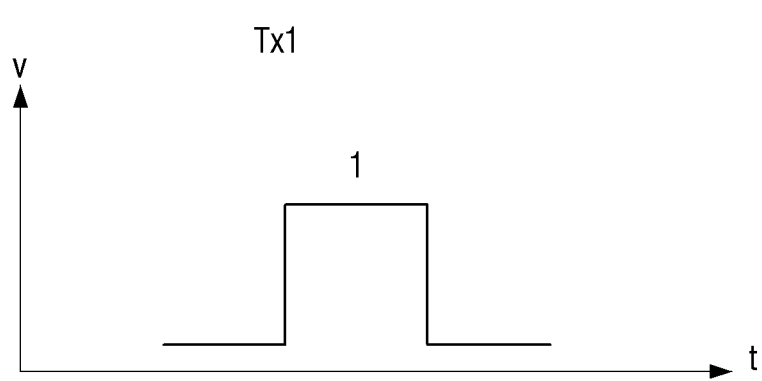
Figure 4:
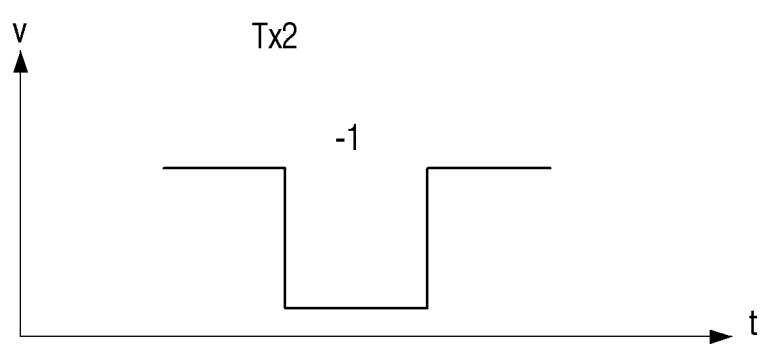
Figure 5:
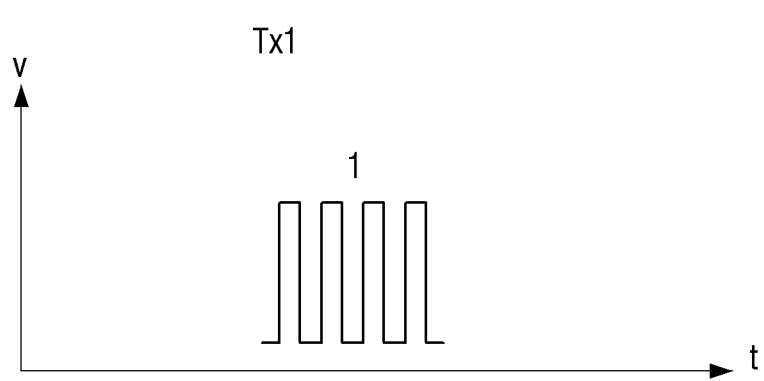
Figure 5:
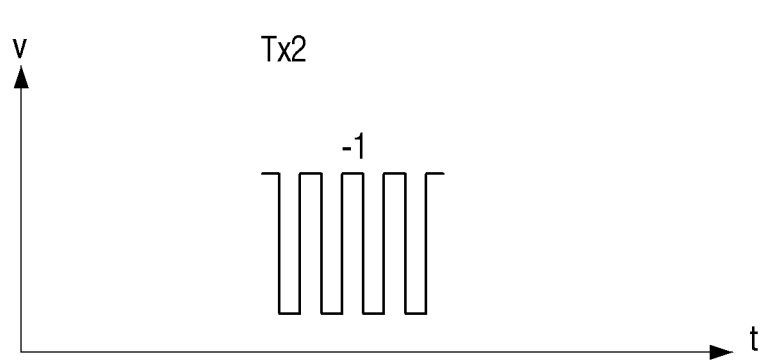

FIGS. 3 to 5 are views showing various examples of a digital code according to an exemplary embodiment.

Specifically, FIG. 3 is a view showing a shape of a digital code according to a first exemplary embodiment.

Referring to FIG. 3, the digital code according to the first exemplary embodiment has two types of edges representing binary values of the digital code. Specifically, in the digital code according to the first exemplary embodiment, a rising edge of a voltage signal corresponds to a first value (+1) of the digital code, and a falling edge of the voltage signal corresponds to a second value (−1) of the digital code.

In addition, FIG. 4 is a view showing a shape of a digital code according to a second exemplary embodiment.

Referring to FIG. 4, the digital code according to the second exemplary embodiment has a pulse shape representing binary values of the digital code. Specifically, referring to view (a) of FIG. 4, in the digital code according to the second exemplary embodiment, a pulse signal (Tx1) formed by a rising edge and a falling edge of a voltage signal corresponds to a first value (+1) of the digital code. In addition, referring to view (b) of FIG. 4, a pulse signal (Tx2) formed by a falling edge and a rising edge of a voltage signal corresponds to a second value (−1) of the digital code.

FIG. 5 is a view showing a shape of a digital code according to a third exemplary embodiment.

Referring to FIG. 5, the digital code according to the third exemplary embodiment has a shape of a plurality of pulse signals representing binary values of the digital code. Specifically, referring to view (a) of FIG. 5, in the digital code according to the third exemplary embodiment, a pulse signal Tx1 starting with a rising edge of a voltage signal and ending with a falling edge corresponds to a first value (+1) of the digital code. Referring to view (b) of FIG. 5, a pulse signal Tx2 starting with a falling edge of a voltage signal and ending with a rising edge corresponds to a second value (−1) of the digital code.

Since the digital signal according to the third exemplary embodiment has a greater number of edges than the digital signal according to the second exemplary embodiment, the response signal may accumulate responses on the rising edge and the falling edge many times, and may acquire a higher SNR than in the cases of FIGS. 3 and 4. In addition, there is an advantage that a low-frequency noise can be effectively removed using a noise removal method when signals are acquired.

Figure 6:
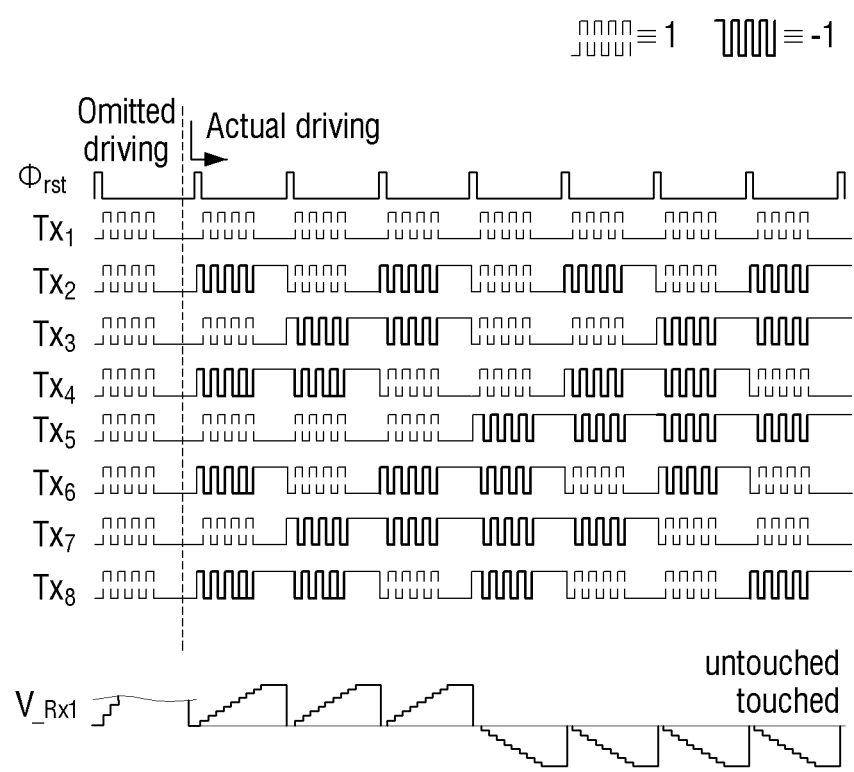
FIG. 6 is a view showing an example of a driving signal when the digital code of FIG. 5 is used.

FIG. 6 is a view showing an example of a driving signal when the digital code of FIG. 5 is used.

FIG. 6 illustrates continuous driving signals corresponding to the Hadamard matrix. The Hadamard matrix is a rectangular matrix in which all elements have any one of values +1 and −1 and two certain vectors are orthogonal to each other. Specifically, two certain rows in the Hadamard matrix are orthogonal to each other. Being orthogonal means that the inner product of the two vectors is 0. In addition, a certain row in the Hadamard matrix except for the first row has the same number of 1 and −1.

For example, when the driving signal is based on a digital code having eight bits, and the j-th digital code applied to the i-th Tx channel is H(i,j) (i=1-8, j=1-8), the Hadamard matrix may be expressed by Equation 1 presented below.

Herein, the column of the matrix indicates a driving signal which is applied to a single first electrode serially, and the row is a driving signal which is inputted to the plurality of first electrodes in a single time unit. For example, the driver 120 may continuously apply driving signals having different two binary values as shown in FIG. 5 to the plurality of first electrodes Tx1 to Tx8 in the single time unit. Specifically, the driver 120 may apply the digital code of FIG. 5 corresponding to 1, −1, 1, −1, 1, −1, 1, −1 to the second electrode Tx2 in the unit of a predetermined time. In addition, at the same time, the driver 120 may apply the driving signals to the other electrodes in the same way.

$$H = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} \quad \text{Equation 1}$$

When the driving signals are applied to the plurality of first channels using the above-described Hadamard matrix, a reception signal V at the second electrode may be expressed by Equation 2 presented below:

$$V = k \cdot H \cdot C \quad \text{Equation 2}$$

Herein, V is a reception signal received at the second electrode and may be expressed by Equation 3 presented below. k is a constant value which is determined according to a gain or a size and a shape of a driving signal, H is the Hadamard matrix and may be expressed by Equation 1 described above. C is capacitance between a single second electrode and the plurality of first electrodes and may be expressed by Equation 4 presented below:

$$V = \begin{pmatrix} Vt1 \\ Vt2 \\ Vt3 \\ Vt4 \\ Vt5 \\ Vt6 \\ Vt7 \\ Vt8 \end{pmatrix} \quad \text{Equation 3}$$

$$C = \begin{pmatrix} C11 \\ C21 \\ C31 \\ C41 \\ C21 \\ C61 \\ C71 \\ C81 \end{pmatrix} \quad \text{Equation 4}$$

When Equations 3 and 4 are applied to Equation 2, the reception signal may be expressed by Equation 5 presented below:

$$V = \begin{pmatrix} Vt1 \\ Vt2 \\ Vt3 \\ Vt4 \\ Vt5 \\ Vt6 \\ Vt7 \\ Vt8 \end{pmatrix} = k \cdot \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} \begin{pmatrix} C11 \\ C21 \\ C31 \\ C41 \\ C21 \\ C61 \\ C71 \\ C81 \end{pmatrix} \quad \text{Equation 5}$$

In Equation 5, each row is a code at a different time and each column is a code applied to a different channel. Specifically, referring to Equation 6, the first row has a digital code of "+1". This means that a digital code of the same value is applied to all of the electrodes in a first time section.

$$\text{time} \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} \begin{pmatrix} C11 \\ C21 \\ C31 \\ C41 \\ C21 \\ C61 \\ C71 \\ C81 \end{pmatrix} \quad \text{Equation 6}$$

Tx Channel

However, when the code of the same value is transmitted to all of the electrodes in the single time section, the reception signal Vt1 in the corresponding time section has a great value. However, since the reception signals in the other time sections are relatively small, a reception circuit which can detect the reception signal in the first time section has a difficulty in detecting a minute signal change in the other sections except for the first time section.

Accordingly, in the present exemplary embodiment, in order to enhance the sensitivity of the reception signal, only the response signals regarding the driving signals in the time sections except for the time section where the driving signals applied to the electrodes have the same value (the first time section in Equation 5) are used for driving. Specifically, the contact location of an object may be measured without using the response signal Vt1 corresponding to the first driving of the Hadamard matrix from among the reception signals, and the exclusion of input of the same parity signal to all of the channels is beneficial to enhancement of the receive sensitivity.

The reason why it is possible to estimate capacitance of each channel even if the Hadamard matrix is modified will be explained below.

Specifically, When a matrix H' in which the time section having the same value in the Hadamard matrix is substituted with "0" is applied to Equation 3, Equation 7 may be acquired as presented below. Equation 7 may be rearranged into Equations 8 and 9 presented below:

$$H'V = \begin{pmatrix} 0 & 1 & 1 & 1 & 1 & 1 & 1 & 1 \\ 0 & 1 & -1 & 1 & -1 & 1 & -1 & 1 & -1 \\ 0 & 1 & 1 & -1 & -1 & 1 & 1 & -1 & -1 \\ 0 & 1 & -1 & -1 & 1 & 1 & -1 & -1 & 1 \\ 0 & 1 & 1 & 1 & 1 & -1 & -1 & -1 & -1 \\ 0 & 1 & -1 & 1 & -1 & -1 & 1 & -1 & 1 \\ 0 & 1 & 1 & -1 & -1 & -1 & -1 & 1 & 1 \\ 0 & 1 & -1 & -1 & 1 & -1 & 1 & 1 & -1 \end{pmatrix} \begin{pmatrix} Vt1 \\ Vt2 \\ Vt3 \\ Vt4 \\ Vt5 \\ Vt6 \\ Vt7 \\ Vt8 \end{pmatrix} \quad \text{Equation 7}$$

$$= \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} \begin{pmatrix} Vt1 \\ Vt2 \\ Vt3 \\ Vt4 \\ Vt5 \\ Vt6 \\ Vt7 \\ Vt8 \end{pmatrix} - \begin{pmatrix} Vt1 \\ Vt1 \\ Vt1 \\ Vt1 \\ Vt1 \\ Vt1 \\ Vt1 \\ Vt1 \end{pmatrix} \quad \text{Equation 8}$$

$$=\begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} \begin{pmatrix} Vt1 \\ Vt2 \\ Vt3 \\ Vt4 \\ Vt5 \\ Vt6 \\ Vt7 \\ Vt8 \end{pmatrix} - Vt1 \begin{pmatrix} 1 \\ 1 \\ 1 \\ 1 \\ 1 \\ 1 \\ 1 \\ 1 \end{pmatrix} \quad \text{Equation 9}$$

When Equation 2 is applied to Equation 9, Equation 10 may be acquired as presented below:

$$= HV - Vt1\,\vec{1}$$
$$= H(kHC) - Vt1\,\vec{1} \quad \text{Equation 10}$$
$$= kHHC - Vt1\,\vec{1}$$

where $\vec{1}$ is a [8×1] matrix in which all of the values is 1.

Since H H=8I according to the characteristic of the Hadamard matrix, Equation 10 may be expressed by Equation presented below:

$$H \cdot V = 8kC - Vt1\,\vec{1} \quad \text{Equation 11}$$

Herein, Vt1 may be expressed by Equation 12 presented below according to Equation 2:

$$Vt1 = kHC$$
$$= k(C11 + C21 + \ldots C81) \quad \text{Equation 12}$$

When average capacitance $C_{avg}$ is defined as shown in Equation 13 presented below, Equation 12 may be expressed by Equation 14. When Equation 14 is applied to above-described Equation 11, Equation 15 may be acquired as presented below:

$$Cavg + (C11 + C21 + \ldots + C81)/8 \quad \text{Equation 13}$$

$$Vt1 = 8k\,Cavg \quad \text{Equation 14}$$

$$H'V = 8k[C - Cavg\,\vec{1}] \quad \text{Equation 15}$$

Finally, the mutual capacitance of a single reception electrode (second electrode) in response to the plurality of transmission electrodes (first electrodes) may be expressed by Equation 16 presented below:

$$C = \frac{1}{8k}H'V + Cavg\,\vec{1} \quad \text{Equation 16}$$

$$= \frac{1}{8k}\begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix}$$

$$\begin{pmatrix} Vt1 \\ Vt2 \\ Vt3 \\ Vt4 \\ Vt5 \\ Vt6 \\ Vt7 \\ Vt8 \end{pmatrix} + \begin{pmatrix} Cavg \\ Cavg \\ Cavg \\ Cavg \\ Cavg \\ Cavg \\ Cavg \\ Cavg \end{pmatrix}$$

Herein, Vt1, ..., Vt8 are defined by Equation 2 and are output values when the H matrix is applied to the first electrodes Tx1 to Tx8. However, since HC and H'C have the same value in T2 to T8, a value of H'C may be substituted. In addition, regarding Vt1 in T1, the first column of H' in Equation 16 is 0, and thus, the capacitance value may be calculated only with $C_{avg}$ without Vt1 in the V vector.

In the above-described example, only the driving signals in the time sections except for the time section having the same value are applied to the channel electrode 110 in the process of generating the driving signals. That is, the above-described operation is performed in the driver. However, the above-described operation may be performed in a receiving end. Specifically, the driver may apply the driving signals according to the Hadamard matrix as in the related-art method, and the receiving end may receive only the response signals excepts for the response signal corresponding to the time section having the same value in the Hadamard matrix.

Referring back to FIG. 6, an example of implementation of a sequence of driving signals for driving eight channels is illustrated. As described in the above-described calculation, Vt1 is not used for measuring the location of a contact object and thus the first sequence may be excluded when the driving signals are applied to the plurality of first electrodes.

In the above-described example, the first sequence is excluded. However, according to another exemplary embodiment, the driving signals may have the same value in a time section other than the first time section.

Figure 7:
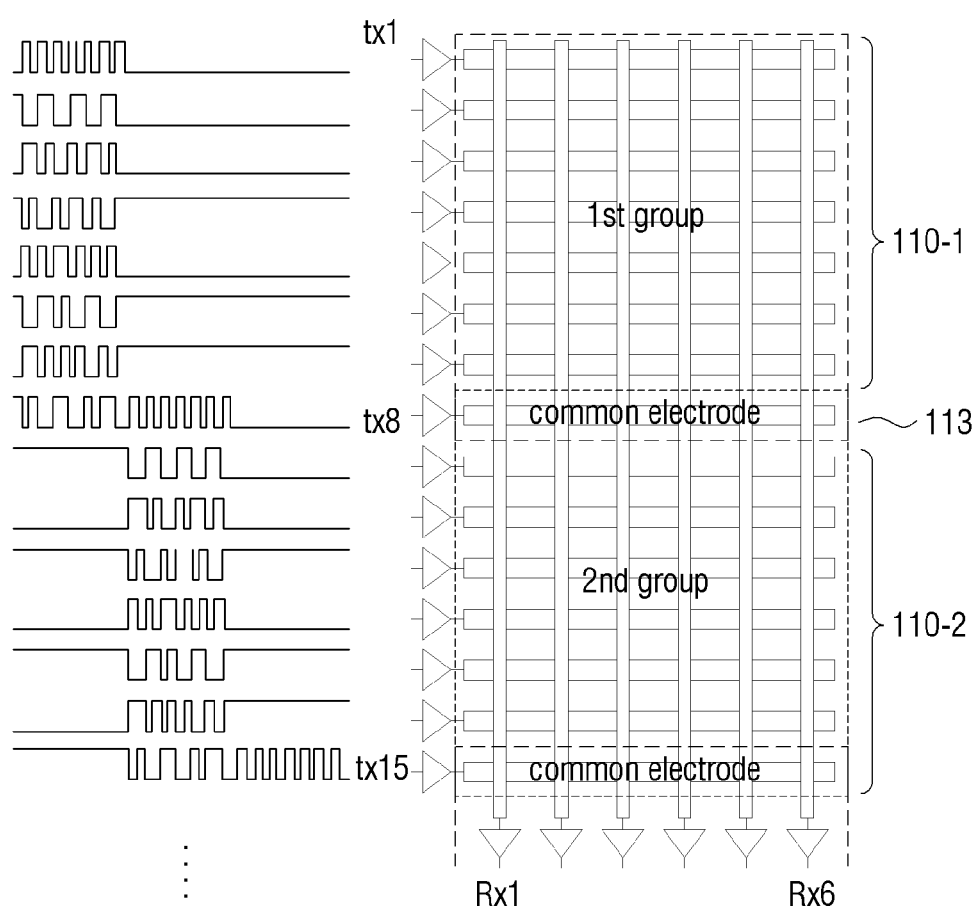
FIG. 7 is a view to illustrate an operation of a driver according to another exemplary embodiment.

FIG. 7 is a view to illustrate an operation of a driver according to another exemplary embodiment.

Referring to FIG. 7, a plurality of first electrodes 111 may be divided into a plurality of sub groups in the unit of a plurality of channels arranged continuously. For example, as shown in FIG. 7, the plurality of first electrodes 111 may be divided into a first sub group 110-1 and a second sub group 110-2. The first sub group 110-1 and the second sub group 110-2 may be continuously arranged and the first sub group 110-1 and the second sub group 110-2 may share at least one electrode 113.

In this case, the driver 120 may apply continuous driving signals simultaneously as described above since the plurality of electrodes in one sub group is a predetermined electrode unit.

The driver 120 may apply the continuous driving signals to all of the electrodes in the first sub group, and then apply the continuous driving signals to all of the electrodes in the second sub group. Specifically, even when the first sub group and the second sub group share a single electrode, the first sub group and the second sub group operate in different time ranges, and thus the operation in the time range of the first sub group is the same as described above.

Meanwhile, when the plurality of sub groups share at least one electrode 113, the controller 140 may calculate the location of an object based on first sub group capacitance in which a first offset is applied to a value based on capacitance of the plurality of electrodes in the first sub group, and second sub group capacitance in which a second offset is applied to a value based on capacitance of the electrodes in the second sub group. Herein, the first offset and the second offset are to make the first sub group capacitance and the second sub group capacitance have the same value regarding the shared first electrode.

The operation of applying the offset described above will be explained in detail below.

To the first sub group (Tx1 to Tx8), the driving signals of H' may be applied, and a corresponding reception signal V1 may be obtained. The first row of V1, V1 (Vt1), is an unknown value as described above.

In addition, the driving signals of H' are also applied to the second sub group (Tx8 to Tx15), and a corresponding reception signal V2 may be obtained. For convenience, when H' is expressed by row vector h1', h8', H' may be expressed by Equation 17 presented below:

$$H' = \begin{pmatrix} 0 & 1 & 1 & 1 & 1 & 1 & 1 & 1 \\ 0 & 1 & -1 & 1 & -1 & 1 & -1 & 1 & -1 \\ 0 & 1 & 1 & -1 & -1 & 1 & 1 & -1 & -1 \\ 0 & 1 & -1 & -1 & 1 & 1 & -1 & -1 & 1 \\ 0 & 1 & 1 & 1 & 1 & -1 & -1 & -1 & -1 \\ 0 & 1 & -1 & 1 & -1 & -1 & 1 & -1 & 1 \\ 0 & 1 & 1 & -1 & -1 & -1 & -1 & 1 & 1 \\ 0 & 1 & -1 & -1 & 1 & -1 & 1 & 1 & -1 \end{pmatrix} = \begin{pmatrix} h1' \\ h2' \\ h3' \\ h4' \\ h5' \\ h6' \\ h7' \\ h8' \end{pmatrix} \quad \text{Equation 17}$$

Based on Equation 16 and the first reception signal V1, which is the result of the driving of the first sub group, the capacitance of the i-th Tx channel and the Rx1 channel may be expressed by Equation 18 presented below. In the same way, based on Equation 16 and the second reception signal V2, which is the result of the driving of the second sub group, the capacitance of the i-th Tx channel and the Rx1 channel may be expressed by Equation 19 presented below:

$C1 = \frac{1}{8}k * h1'V1 + Cavg1$ $C2 = \frac{1}{8}k * h2'V1 + Cavg1$

...

$C8 = \frac{1}{8}k * h8'V1 + Cavg1$ \quad Equation 18 where Cavg1 is a first average capacitance value corresponding to the first electrodes (Tx1 to Tx8) defined by Equation 13.

$C8 = \frac{1}{8}k * h1'V2 + Cavg2$ $C9 = \frac{1}{8}k * h2'V2 + Cavg2$

...

$C15 = \frac{1}{8}k * h8'V2 + Cavg2$ \quad Equation 19 where Cavg2 is a second average capacitance value corresponding to the first electrodes (Tx1 to Tx8) defined by Equation 13.

Since C8 in Equations 18 and 19 should have the same value, the second average capacitance value may be expressed by Equation 20 presented below:

$$C8 = 1/8k * h8'V1 + Cavg1 \quad \text{Equation 20}$$
$$= 1/8k * h1'V2 + Cavg2$$

$$Cavg2 = 1/8k * [h8'V1 - h1'V2] + Cavg1$$

Accordingly, the capacitance of Tx1 to Tx15 and Rx1 in Equations 18, 19, and 20 may be expressed by H'V1, H'V2, and Cavg1 presented below.

$C1 = \frac{1}{8}k * [h1'V1] + Cavg1$ $C2 = \frac{1}{8}k * [h2'V1] + Cavg1$

...

$C8 = \frac{1}{8}k * h8V1 + Cavg1$ $C9 = \frac{1}{8}k * [h8'V2 + h8V1 - h1V2] + Cavg1$

...

$C15 = \frac{1}{8}k * [h8'V2 + h8'V1 - h1'V2] + Cavg1$ \quad Equation 21

Meanwhile, Cavg1 is equally applied to the whole Tx channels and the capacitance, and thus does not influence the calculation of the location of the contact object. Therefore, the same result may be obtained even when the location of the contact object is extracted from Equation 22 excluding Cavg1.

$C1 = \frac{1}{8}k * [h1'V1]$ $C2 = \frac{1}{8}k * [h2'V1]$

...

$C8 = \frac{1}{8}k * [h8V1]$ $C9 = \frac{1}{8}k * [h8'V2 + h8V1 - h1V2] + Cavg1$

...

$C15 = \frac{1}{8}k * [h8'V2 + h8'V1 - h1'V2] + Cavg1$ \quad Equation 21

Since the H' matrix is a matrix in which the first column is 0, H'V1 and H' V2 calculate results regardless of the response signals Vt1 (g1) and Vt2 (g2) of the first sub group and the second sub group, which are the first values of V1 and V2.

Therefore, Vt1 (g1) and Vt2 (g2) does not need to be calculated, and a great signal of Vt1 does not need to be calculated. Therefore, the dynamic range of the reception circuit may be set to be small, so that the sensitivity of the reception circuit can be enhanced.

Meanwhile, the above-described offset may be obtained by accumulating differences in the capacitance. Specifically, Equations 18 and 19 may be expressed by Equations 23 and 24 presented below. In addition, a difference value in the mutual capacitance for the neighboring Tx channel may be obtained by Equation 25 presented below:

$C1 = c1 + Cavg1$ $C2 = c2 + Cavg1$

...

$C8 = c8 + cavg1$ \quad Equation 23

$$C8 = c8' + Cavg2$$

$$C9 = c9' + Cavg2$$

$$\ldots$$

$$C15 = c15' + Cavg2 \quad \text{Equation 24}$$

$$C2 - C1 = c2 - c1$$

$$C3 - C2 = c3 - c2$$

$$\ldots$$

$$C8 - C7 = c8 - c7$$

$$C9 - C8 = c9' - c8'$$

$$C15 - C14 = c15' - C14' \quad \text{Equation 25}$$

where $c1, c2, \ldots, c8, c8', \ldots, c15'$ are values calculated from a product of H' and V1 and V2.

When the values of Equation 25 are accumulated and arranged, they may be expressed by Equation 26 presented below:

$$C2 - C1 = c2 - c1$$

$$C3 - C2 + C2 - C1 = C3 - C1 = c3 - c1$$

$$C4 - C3 + C3 - C2 + C2 - C1 = C4 - C1 = c4 - c1 \quad \text{Equation 26}$$

In addition, when Equation 26 is arranged considering that the same C8 is calculated in the first sub group and the second sub group, each capacitance may be arranged as in Equation 27 presented below:

$$C2 - C1 = c2 - c1$$

$$C3 - C1 = c3 - c1$$

$$\ldots$$

$$C8 - C1 = c8 - c1$$

$$C9 - C1 = c9' - c8' + c8 - c1$$

$$C10 - C1 = c10' - c8' + c8 - c1$$

$$C15 \cdot C1 = c15' - c8' + c8 - c1 \quad \text{Equation 27}$$

Herein, since C1 and c1 are offset values which are equally applied to the entire capacitance, C1 and c1 do not influence the calculation of the location of the contact object. Therefore, when these values are disregarded, each capacitance may be calculated as in Equation 28 presented below:

$$C1 = 0$$

$$C2 = c2$$

$$C3 = c3$$

$$\ldots$$

$$C8 = c8$$

$$C9 = c9' - c8' + c8$$

$$C10 = C10' - c8' + c8$$

$$C15 = c15' - c8' + c8 \quad \text{Equation 28}$$

As a result, except for Equation C1, Equation 28 has the same form as Equation 22 described above.

In an embodiment, the method of obtaining the capacitance by calculating a difference value in the mutual capacitance with the neighboring Tx channel and then accumulating the values is more beneficial since values corresponding to h8'V1 to h1'V2 do not need to be stored separately.

In the above-described example, the plurality of sub groups are operated serially. However, according to an exemplary embodiment, a specific sub group from among the plurality of sub groups may be operated alone. Specifically, the controller 140 may determine a sub group to apply driving signals based on the location of the contact object detected during the previous process. According to such a determination, the driver 120 may apply the driving signals only to the determined sub group.

Meanwhile, in the above-described example, the plurality of sub groups are determined in advance. However, according to an exemplary embodiment, the configuration of the sub group may be changed in the unit of a predetermined time. For example, when the location of the contact object detected in the previous process is the first electrode 111-5, eight first electrodes (for example, 111-2, 111-3, 111-4, 111-5, 111-6, 111-7, 111-8, 111-9) with reference to the first electrode 111-5 may be determined as one sub group.

As described above, when the driving signals are applied only to some sub groups, the driving signals do no need to be applied to all of the electrodes and thus unnecessary power consumption can be reduced. In addition, since the number of driven electrodes is reduced and calculation is performed only for a small number of response signals, the operation can be simplified. In addition, in the case of a large contact area of the contact object, saturation at the receiving end can be prevented. Furthermore, since the length of the entire driving sequence is reduced, the sensing speed can be improved, or the sensitivity can be enhanced by increasing the length of the driving signal corresponding to a unit digital code.

Meanwhile, the partial driving operation for the first electrode as described above may be similarly performed for the receiving end. That is, only the response signals for some second electrodes may be processed according to the location of the contact object detected in the previous process.

In FIG. 7, the plurality of first electrodes include only two sub groups. However, according to an exemplary embodiment, the first electrodes may be divided into three or more sub groups.

Figure 8:
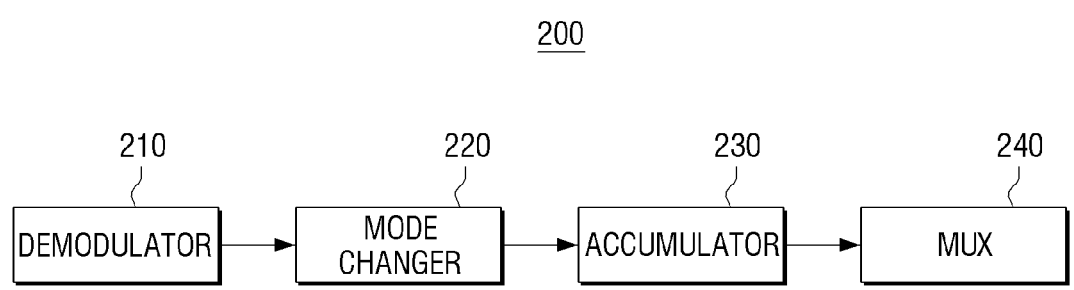
FIG. 8 is a view showing a configuration of a receiver according to a first exemplary embodiment.
Figure 9:
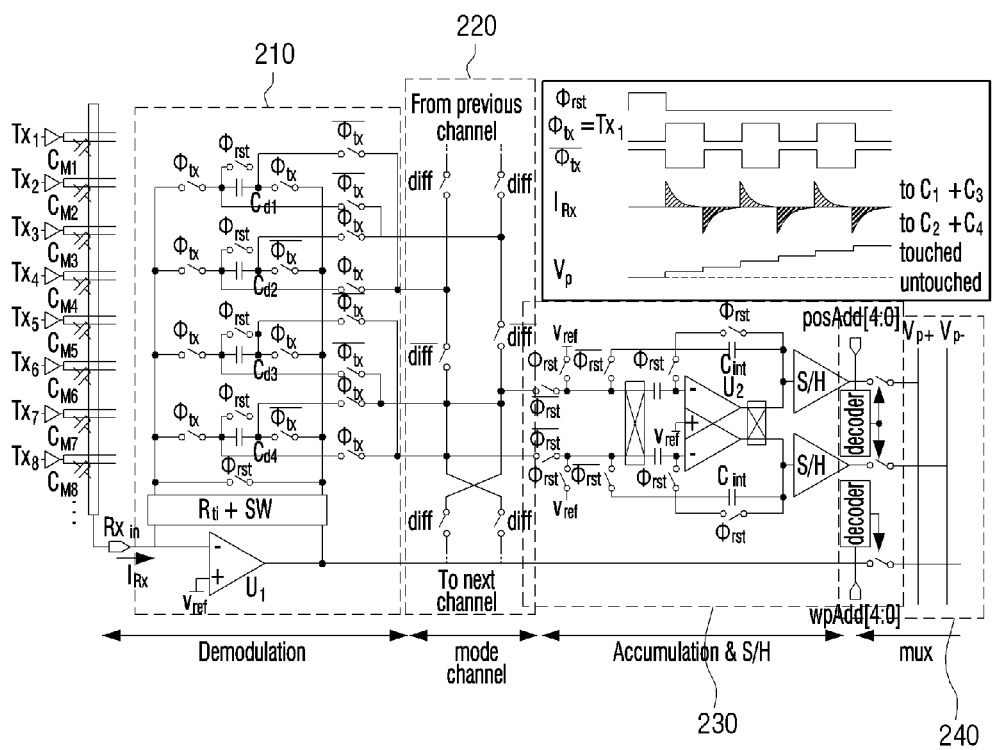
FIG. 9 is a view showing a circuit diagram of a receiver according to the first exemplary embodiment.

FIG. 8 is a view showing a configuration of a receiver according to a first exemplary embodiment. FIG. 9 is a view showing a circuit diagram of the receiver according to the first exemplary embodiment. Specifically, FIG. 9 illustrates an example of a configuration of a reception circuit in which Tx channels 1-8 are connected with Rx through mutual capacitances $C_{M1}$ to $C_{M8}$. In the illustrated circuit, a single Rx channel is displayed for the easy explanation, but, a plurality of circuits may be provided according to an exemplary embodiment.

Referring to FIGS. 8 and 9, the receiver 200 includes a demodulator 210, a mode changer 220, an accumulator 230, and a mux 240.

The demodulator 210 demodulates a received response signal using an integrator. Specifically, the demodulator 210 may include a single OP-AMP, a first capacitor Cd1, a second capacitor Cd2, and a plurality of switches for changing connection states between the OP-AMP and the plurality of capacitors. The plurality of switches allow the first capacitor Cd1 to operate as an integrator along with the OP-AMP in the first section of the response signals. In addition, the plurality of switches allow the second capacitor Cd2 to operate as an integrator for the OP-AMP in the second section of the response signals. Accordingly, the response signals may be accumulated with the rising edge of the response signals using the first capacitor Cd1 in the first section where the driving signals increases. In addition, the response signals may be accumulated with the falling edge of the response signals using the second capacitor Cd2 in the second section where the driving signals are reduced.

The mode changer 220 may selectively receive response signals of a single channel or detect a differential signal with a neighboring channel. Specifically, the mode changer 220 may connect the first capacitor and the second capacitor of the demodulator 210 to the accumulator.

Specifically, the right terminal of the first capacitor is connected to a lower input terminal of the accumulator 230, and the left terminal of the first capacitor is connected with an upper input terminal of the accumulator 230.

In addition, the right terminal of the second capacitor is connected to the upper input terminal of the accumulator 230, and the left terminal of the second capacitor is connected with the upper input terminal of the accumulator 230. Accordingly, the signals accumulated in the first capacitor and the second capacitor are accumulated in the accumulator 230 with different polarities.

The accumulator 230 accumulates the response signals demodulated in the demodulator 210. Specifically, the accumulator 230 includes an accumulation capacitor to accumulate electric charge transmitted from the demodulator 210.

Specifically, the accumulating capacitor accumulates response signals with respect to a plurality of rising edges and falling edges until the $\phi_{rst}$ signal comes in. When $\overline{\phi_{tx}}$ signal for the first capacitor Cd1 and $\phi_{tx}$ signal for the second capacitor Cd2 are applied, the accumulating capacitor receives response signals from the demodulator 210.

Since $\phi_{tx} = Tx_1$, the accumulator 230 may accumulate the response signals of the second section (falling edge) accumulated in the second capacitor Cd2 while the driving signals of the first section are applied to the first capacitor Cd1 (rising edge).

The mux 240 may selectively output the signals of a desired reception circuit from among a plurality of reception circuits.

As described above, the receiver according to the first exemplary embodiment individually accumulates and outputs the signals of the different polarities using the two capacitors, and thus the noise component included in the process of receiving the response signals is offset in the process of changing the polarity, and thus high quality SNR can be achieved.

Figure 10:
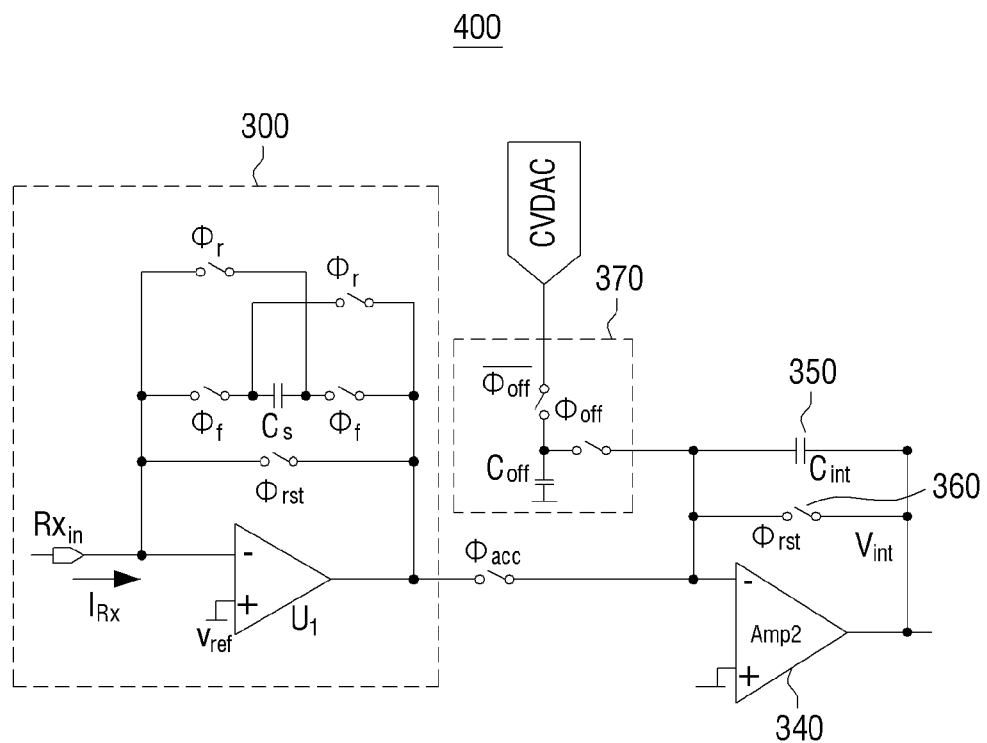
FIG. 10 is a view showing a circuit diagram of a receiver according to a second exemplary embodiment.

FIG. 10 is a view showing a circuit diagram of a receiver according to a second exemplary embodiment.

Referring to FIG. 10, the receiver 400 includes a demodulator 300, accumulators 340, 350, and 360, and an offset unit 370

The demodulator 300 accumulates the response signals using a single capacitor. Specifically, the demodulator 300 includes an integrator which accumulates the response signals in a first direction of the capacitor in the first section of the response signals, and accumulates the response signals in a second direction of the capacitor in the second section of the response signals. A detailed operation of such a demodulator 300 will be explained in detail below with reference to FIG. 11.

The accumulators 340, 350, and 360 include an accumulation capacitor 350 to accumulate the response signals demodulated in the demodulator 300 in the accumulation capacitor 350.

The offset unit 370 stores a predetermined amount of offset electric charge. Specifically, an offset capacitor $C_{off}$ may store a predetermined amount of offset electric charge according to a voltage determined in a constant voltage digital to analog converter (CVDAC).

Specifically, when a switch $\phi_{off}$ is connected in a phase $\phi_{off}$, the offset unit 370 may transmit the offset electric charge to the accumulation capacitor 350 of the accumulators 340, 350, 360.

The offset electric charge is adjustable in the CVDAC. Therefore, when the offset electric charge is adjusted to offset the mutual capacitance entering from the demodulator 300, the offset of the capacitance entering from the demodulator can be effectively removed.

Figure 11:
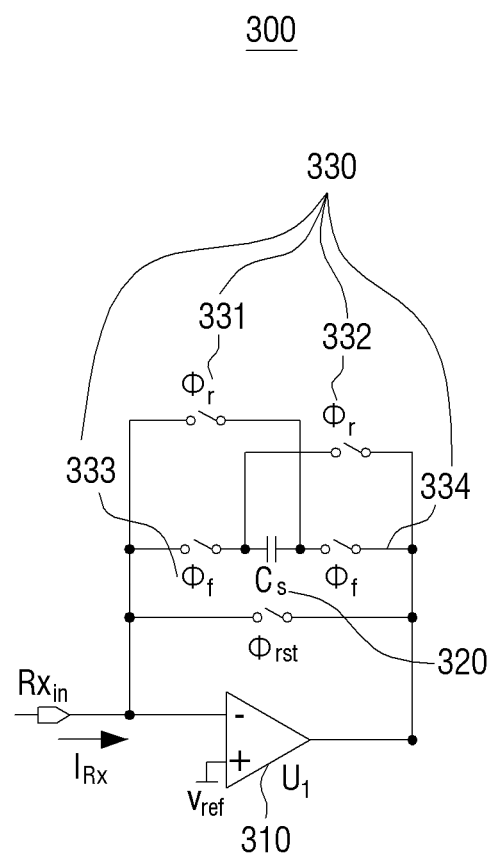
FIG. 11 is a view to illustrate an operation of a demodulator of FIG. 10.

FIG. 11 is a view to illustrate the operation of the demodulator of FIG. 10.

Referring to FIG. 11, the demodulator 300 includes an amplifier 310, a capacitor 320, and a plurality of switches 330.

The capacitor 320 configures the integrator with the amplifier 310. However, according to a connection state of the plurality of switches 300, the capacitor 320 may configure the integrator with the amplifier in a first direction (specifically, an arrangement direction of the capacitor) alternately, and may configure the integrator with the amplifier in a second direction which is the opposite direction to the first direction.

Specifically, when a third switch 333 and a fourth switch 334 are connected in the phase $\phi_f$, the capacitor 320 is connected with respect to an input signal in a forward direction (or the first direction), and, in the phase $\phi_f$, a first switch 221 and a second switch 332 are connected, and the capacitor 320 is connected with respect to an input signal in the reverse direction (or the second direction).

Accordingly, the demodulator 300 may accumulate the response signals to the driving signals with different polarities using a single capacitor.

Figure 12:
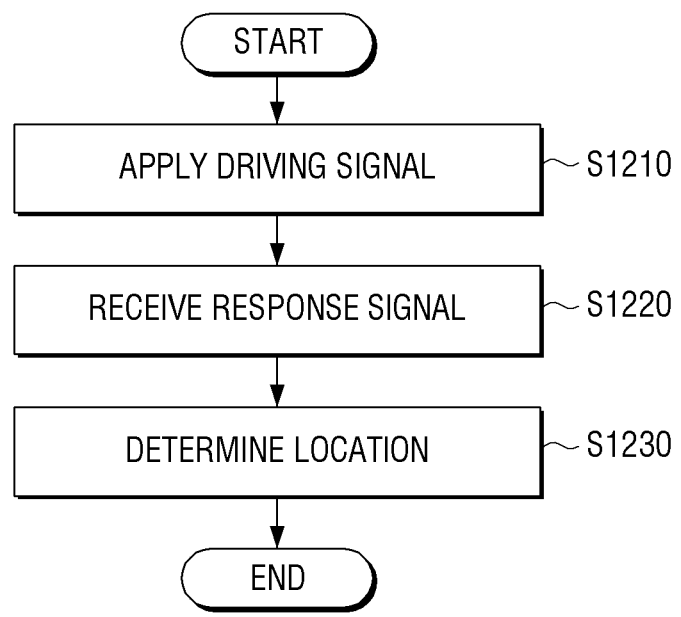
FIG. 12 is a flowchart to illustrate a method for controlling of a coordinate indicating apparatus according to an exemplary embodiment.

FIG. 12 is a flowchart to illustrate a control method of a coordinate indicating apparatus according to an exemplary embodiment.

Driving signals are applied to a plurality of first electrodes arranged in the channel electrode in the first direction in the unit of a plurality of electrodes, simultaneously (S1210). Accordingly, response signals are excited in the first electrodes. In this case, the same driving signals may be simultaneously applied to the plurality of first electrodes in the unit of the plurality of electrodes. In addition, the driving signal may have continuous binary values corresponding to the Hadamard matrix or may have continuous binary values corresponding to the modified Hadamard matrix.

The response signals are received from each of second electrodes arranged in the second direction perpendicular to the first direction (S1220). In this case, the response signals of the plurality of second signals may be received in the unit of a single channel or may be received in parallel in the unit of a plurality of channels.

In addition, the location of a contact object is determined based on the driving signals transmitted to the first electrodes and the response signals received from the first electrodes (S1230). Specifically, capacitance between electrodes is calculated at the plurality of points of intersection which are formed between the first electrodes and the second electrodes in the unit of electrodes, and the location of the contact object is determined based on the calculated capacitance.

The control method of the coordinate indicating apparatus according to the exemplary embodiments described above applies, to the plurality of first electrodes, continuous driving signals corresponding to a matrix except for a time section where the driving signals applied to the electrodes have the same value. Therefore, the signals received in each section are not greatly changed. That is, the range of signals which can be received at the reception circuit may be set to be small, and thus it is easy to detect a minute change in the capacitance in driving electrodes, so that receive sensitivity can be enhanced. The control method of FIG. 12 may be executed in the coordinate indicating apparatus having the configuration of FIG. 1, or may be executed in a coordinate indicating apparatus having the other configuration.

In addition, the control method described above may be implemented by a program which can be executed in the controller 140 of FIG. 1, and the program including the control method may be stored in a non-transitory computer readable medium and provided.

The non-transitory computer readable medium refers to a medium that stores data semi-permanently rather than storing data for a very short time, such as a register, a cache, a memory or etc., and is readable by an apparatus. In detail, the aforementioned programs may be stored and provided in the non-transitory computer readable media such as CD, DVD, hard disc, blue ray disc, USB, a memory card, ROM, etc.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A coordinate indicating apparatus, comprising:
  a channel electrode which includes a first plurality of electrodes arranged in a first direction and a second plurality of electrodes arranged in a second direction perpendicular to the first direction, and which has capacitance between the first plurality of electrodes and the second plurality of electrodes, the capacitance being changed by an approach of a contact object;
  a driver configured to generate a driving signals from a plurality of input signals using a modified Hadamard matrix, and apply the driving signals to the first plurality of electrodes simultaneously;
  a receiver configured to receive response signals from the second plurality of electrodes; and
  a controller configured to determine a location of the contact object based on the driving signals transmitted to the first plurality of electrodes and the response signals received from the second plurality of electrodes,
  wherein the modified Hadamard matrix comprises a Hadamard matrix modified to change all values of a column of which the all values are the same, to zero, and
  wherein each column of the modified Hadamard matrix is corresponding to each time section on which the driving signal are applied to the first plurality of electrodes.

2. The coordinate indicating apparatus of claim 1, wherein the controller is configured to calculate capacitance at a plurality of points of intersection which are formed between the first plurality of electrodes and the second plurality of electrodes, and determine the location of the contact object based on the calculated capacitance.

3. The coordinate indicating apparatus of claim 1, wherein the first plurality of electrodes are divided into a plurality of sub groups which are continuously arranged into a plurality of channels, and
  wherein the driver is configured to apply the driving signals to all electrodes in a single sub group simultaneously.

4. The coordinate indicating apparatus of claim 3, wherein the plurality of sub groups includes a first sub group and a second sub group, and wherein the driver is configured to apply continuous driving signals to all of the electrodes in the first sub group, and then apply continuous driving signals to all of the electrodes in the second sub group simultaneously.

5. The coordinate indicating apparatus of claim 4, wherein the first sub group and the second sub group share at least one electrode.

6. The coordinate indicating apparatus of claim 5, wherein the first sub group and the second sub group are continuously arranged.

7. The coordinate indicating apparatus of claim 5, wherein the controller is configured to calculate the location of the contact object based on first sub group capacitance, in which a first offset is applied to a first value based on a capacitance of the first sub group, and second sub group capacitance in which a second offset is applied to a second value based on capacitance of the second sub group, and
  wherein the first offset and the second offset are determined such that the first sub group capacitance and the second sub group capacitance have a same value with respect to the shared first electrode.

8. The coordinate indicating apparatus of claim 3, wherein the driver is configured to apply the driving signals only to one sub group from among the plurality of sub groups.

9. The coordinate indicating apparatus of claim 8, wherein the electrodes in the one sub group to which the driving signals are applied are changed over a predetermined time unit.

10. The coordinate indicating apparatus of claim 1, wherein the receiver is configured to receive the response signals of the second plurality of electrodes in parallel in a plurality of channels.

11. The coordinate indicating apparatus of claim 1, wherein the driver is configured to generate, as driving signals, a first plurality of pulse signals, the first plurality of pulse signals starting with a rising edge and ending with a falling edge according to a first value of the matrix, and to generate, as driving signals, a second plurality of pulse signals, the second plurality of pulse signals starting with a falling edge and ending with a rising edge in response to a second value of the matrix.

12. The coordinate indicating apparatus of claim 11, wherein the receiver is configured to accumulate the response signals as a first plurality of response signals using a first capacitor, and as a second plurality of response signals using a second capacitor.

13. A coordinate indicating apparatus, comprising:
  a channel electrode which includes a first plurality of electrodes arranged in a first direction and a second plurality of electrodes arranged in a second direction perpendicular to the first direction, and which has capacitance between the first plurality of electrodes and the second plurality of electrodes, the capacitance being changed by an approach of a contact object;
  a driver configured to apply continuous driving signals corresponding to a modified Hadamaid matrix to the first plurality of electrodes simultaneously;

a receiver configured to receive response signals from the second plurality of electrodes; and a controller configured to determine a location of the contact object based on the driving signals transmitted to the first plurality of electrodes and the response signals received from the second plurality of electrodes, wherein the modified Hadamard matrix comprises a Hadamard matrix modified to change all values of a column of which the all values are the same, to zero, and wherein each column of the modified Hadamard matrix is corresponding to each time section on which the driving signals are applied to the first plurality of electrodes.

14. The coordinate indicating apparatus of claim 13, wherein the first plurality of electrodes are divided into a plurality of sub groups which are continuously arranged into a plurality of channels, wherein the plurality of sub groups includes a first sub group and a second sub group, the first sub group sharing at least one electrode with the second sub group, wherein the controller is configured to calculate the location of the object based on a first sub group capacitance, in which a first offset is applied to a first value based on capacitance of the first sub group, and second sub group capacitance, in which a second offset is applied to a second value based on capacitance of the second sub group, and wherein the first offset and the second offset are determined such that the first sub group capacitance and the second sub group capacitance have a same value with respect to the shared first electrode.

* * * * *